(No Model.)
G. MOOR.
GOPHER TRAP.
No. 485,421. Patented Nov. 1, 1892.
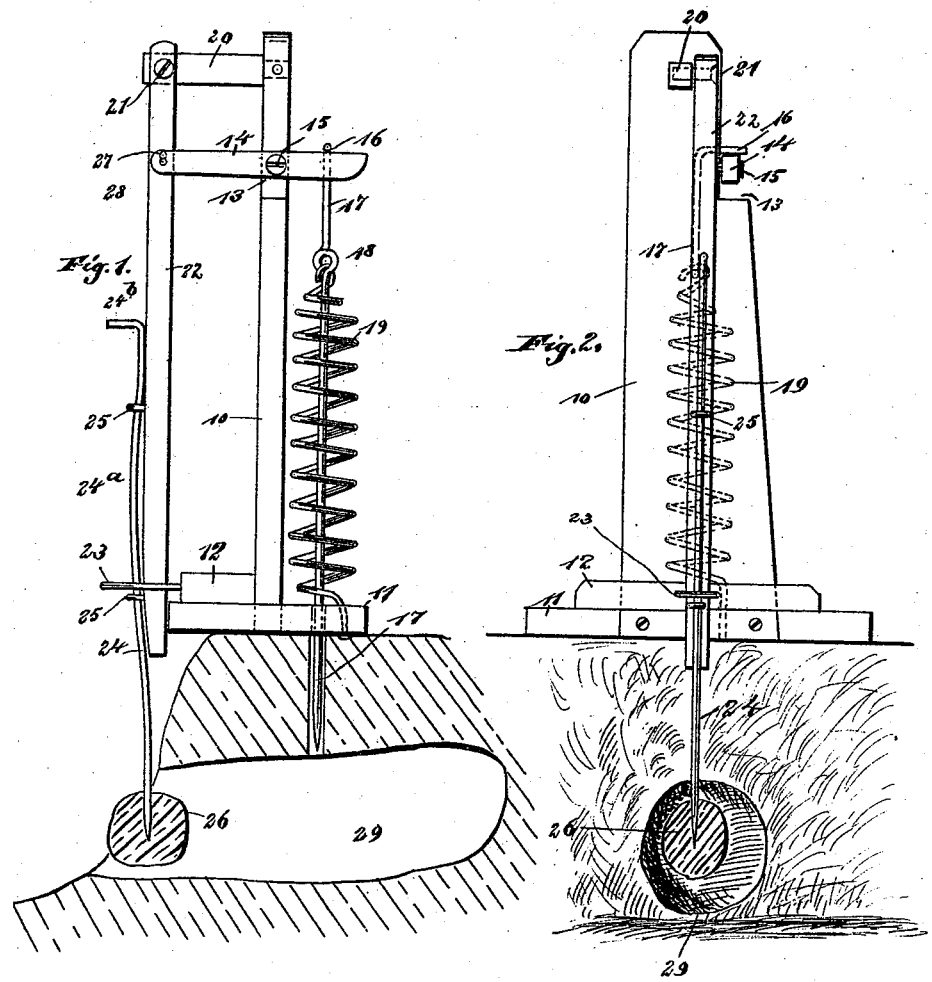
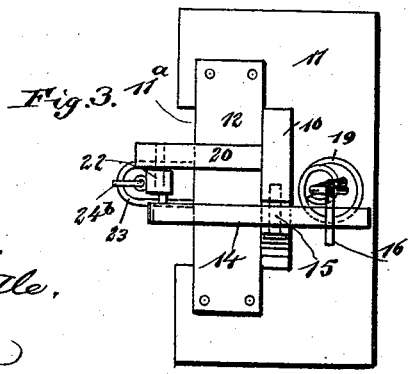
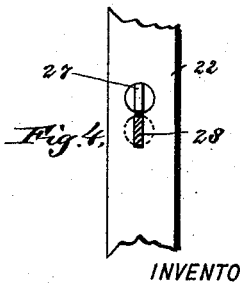
WITNESSES:
F. McArdle
C. Sedgwick
INVENTOR
G. Moor
BY Munn & Co.
ATTORNEYS.

UNITED STATES PATENT OFFICE.

GEORGE MOOR, OF LA FAYETTE, OREGON.

GOPHER-TRAP.

SPECIFICATION forming part of Letters Patent No. 485,421, dated November 1, 1892.

Application filed April 19, 1892. Serial No. 429,719. (No model.)

*To all whom it may concern:*

Be it known that I, GEORGE MOOR, of La Fayette, in the county of Yam Hill and State of Oregon, have invented a new and Improved Gopher-Trap, of which the following is a full, clear, and exact description.

My invention is an improvement in that class of automatic gopher-traps which are provided with a spring-actuated impaling spear and mechanism adapted for tripping it when the gopher attempts to pass beneath the trap.

The construction and combination of parts constituting the invention are as hereinafter described and claimed.

Reference is to be had to the accompanying drawings, forming a part of this specification, in which similar figures of reference indicate corresponding parts in all the views.

Figure 1 is a side elevation of the trap, showing it in set position over a gopher-hole. Fig. 2 is a front elevation of the trap in the same position. Fig. 3 is a plan of the trap, and Fig. 4 is an enlarged detail view showing the engaging-studs of the swinging lever and trigger.

The trap is provided with an upright 10, which is preferably widened at the base to increase its strength, and the upright is fixed at its lower end to a base 11, which is cut away on one side, as shown at 11$^a$, to facilitate the fastening of the upright thereto. A cross piece or brace 12 extends across the base in front of the upright, and the back side of the cross-piece abuts with the front side of the upright. The inclined side of the upright 10 is cut away near the top, as shown at 13, and a trigger 14 is pivoted above the shoulder thus formed, as shown at 15. The rear end of the trigger is adapted to engage the bent upper end 16 of the spear 17, which is held to move vertically through a perforation in the base 11 and terminates at its lower end in a point, as shown in Fig. 1. The spear 17 is provided with an eye 18 or its equivalent near its upper end, and to this is attached one end of a spring 19, the lower end of the spring being secured to the base 11. The spring 19 is a strong one, and its tension is such as to normally force down the spear.

At the top of the upright 10 is a forwardly-extending arm 20, to which is pivoted, as shown at 21, a lever 22, which extends downward in front of the base 11 and is held to move in a keeper 23, which projects forward from the cross-piece 12. On the front side of the lever 22 is a sliding rod 24, which is held to slide in keepers 25, secured to the lever, and the rod has an outward bend 24$^a$ in the middle to cause it to press against the keepers, so that it may be held at any height, although it may be made perfectly straight, if desired. The upper end of the rod terminates in a bend 24$^b$, which serves as a handle, and the lower end terminates in a point on which the bait 26 may be stuck.

The front end of the trigger 14 extends at one side of the lever 22, and on the inner side of the trigger is a stud 28, (shown in detail in Fig. 4,) which is adapted to engage a similar stud 27 on the lever 22. It will thus be seen that the slightest movement of the lever 22 will swing the stud 27 from off the stud 28, thus releasing the trigger 14 and permitting the spring 19 to pull down the spear.

The operation of the trap is as follows: It is placed over or near the mouth of a gopher-hole 29, the spear is thrust up and down through the roof of the hole a few times, so as to guard against any excessive resistance when the trap is sprung. The rod 24 is provided with a bait 26, which is adjusted in the mouth of the hole 29, the spear is pulled upward and its bent end 16 placed upon the trigger 14, and the stud 28 on the trigger is placed beneath the stud 27 on the lever 22. When the gopher wishes to come out of his hole, he will attempt to eat the bait 26 or else will push the dirt in front of him against the bait, and in either case the lever 22 will be swung so as to release the trigger 14, and the spring 19 will then throw the spear 17 forcibly downward and will cause it to transfix the gopher.

The trap described above is especially adapted for use in killing gophers; but it will be understood that it may be used for killing other small animals.

Having thus described my invention, I claim as new and desire to secure by Letters Patent—

1. A gopher-trap comprising an upright, a trigger pivoted on the upright and extending from opposite sides thereof, a spring-pressed spear held parallel with the upright and having one end adapted to engage the trigger, and a swinging bait-lever pivoted in front of the upright and having means for attachment to the front end of the trigger with said bait-lever carrying a device which holds the bait in the outer end of the gopher-hole, substantially as described.

2. A gopher-trap comprising an upright, a spring-pressed spear held on one side of the upright and having a bent upper end, a bait-lever held to swing on the opposite side of the upright and having a bait-holding device at its lower end, which is adapted to project into the front end of the gopher-hole, and the trigger 14, pivoted horizontally on said upright and having one end arranged to engage the bent spear end and the opposite end provided with a stud to engage the stud on the bait-lever, substantially as described.

3. A gopher-trap comprising a base and an upright secured to the base, a spring-pressed spear held on one side of the upright and adapted to move through the base, a swinging lever pivoted on the opposite side of the upright, a vertically-movable bait-rod mounted on the swinging lever and having a bent upper end, and a trigger pivoted on the upright, the trigger having one end adapted to engage the spear and the opposite end detachably secured to the swinging bait-lever, substantially as described.

GEORGE MOOR.

Witnesses:
WM. P. SHAW,
J. E. HUBBARD.